US012700642B2

(12) United States Patent
Arnesson et al.

(10) Patent No.: US 12,700,642 B2
(45) Date of Patent: Aug. 4, 2026

(54) PROTECTIVE COVER FOR PROTECTING A VENTILATION DEVICE OF A BATTERY HOUSING

(71) Applicant: VOLVO TRUCK CORPORATION, Gothenburg (SE)

(72) Inventors: Simon Arnesson, Öckerö (SE); Vikram Alokar, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 630 days.

(21) Appl. No.: 18/343,518

(22) Filed: Jun. 28, 2023

(65) Prior Publication Data

US 2024/0014508 A1      Jan. 11, 2024

(30) Foreign Application Priority Data

Jul. 6, 2022     (EP) ..................................... 22183387

(51) Int. Cl.
*H01M 50/30*        (2021.01)
*H01M 50/24*        (2021.01)
*H01M 50/249*       (2021.01)

(52) U.S. Cl.
CPC ......... *H01M 50/394* (2021.01); *H01M 50/24* (2021.01); *H01M 50/249* (2021.01); *H01M 2220/20* (2013.01)

(58) Field of Classification Search
CPC .................................................. H01M 50/394
See application file for complete search history.

(56) References Cited

U.S. PATENT DOCUMENTS 7,951,474 B2     5/2011   Schembri et al.
11,081,758 B2 *  8/2021   Czech ...................... B60K 1/04
(Continued)

FOREIGN PATENT DOCUMENTS

EP           915525 A1     5/1999
EP          3477756 A1     5/2019
(Continued)

OTHER PUBLICATIONS

Extended European Search Report in corresponding European Application No. 22183387.4 dated Jan. 9, 2023 (5 pages).

*Primary Examiner* — Hung V Ngo
(74) *Attorney, Agent, or Firm* — Jeffri A. Kaminski; Venable LLP

(57) ABSTRACT

A protective cover for protecting a ventilation device of a battery housing. The protective cover includes an airflow duct extending between a first opening and a second opening, wherein the first opening of the airflow duct is arranged to be fluidly connected to the airflow opening of the ventilation device and wherein the second opening is arranged to be fluidly connected to the external environment, an attachment portion associated with the first opening for attaching the protective cover to the first flange portion so that the protective cover covers the airflow opening, wherein the attachment portion, when being attached to the first flange portion, extends around the airflow opening, The protective cover has at least two separate parts which are releasably attachable to each other and arranged so that the attachment portion can be split into at least two separate attachment sections to allow the protective cover to be attached to and released from the first flange portion.

15 Claims, 4 Drawing Sheets

(56)          References Cited

U.S. PATENT DOCUMENTS

| 2016/0036025 | A1  | 2/2016 | Hofer |
| 2022/0112962 | A1  | 4/2022 | Dotzler et al. |
| 2023/0038944 | A1* | 2/2023 | Einoegg ................ H01M 50/30 |
| 2023/0187770 | A1* | 6/2023 | Gyulai ................ H01M 50/342 |

FOREIGN PATENT DOCUMENTS

| GB | 2517468  | A | 2/2015 |
| JP | H9245768 | A | 9/1997 |

* cited by examiner

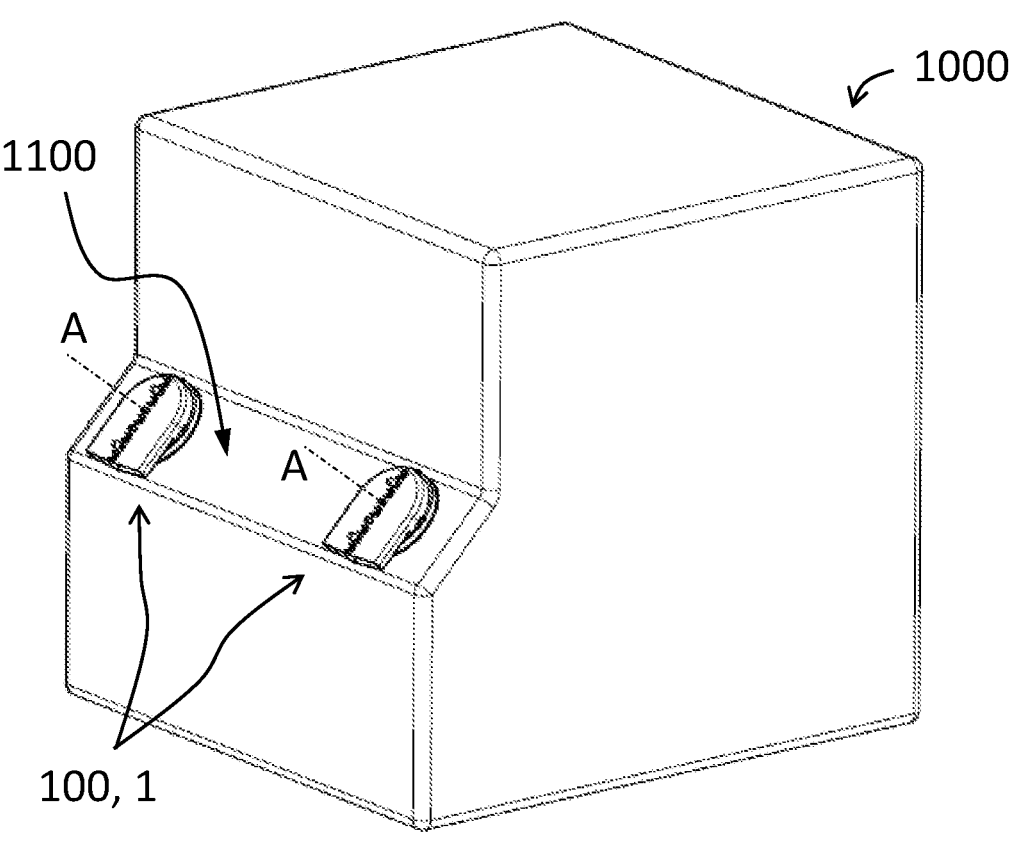
1000
1100
A
A
100, 1
Fig. 5
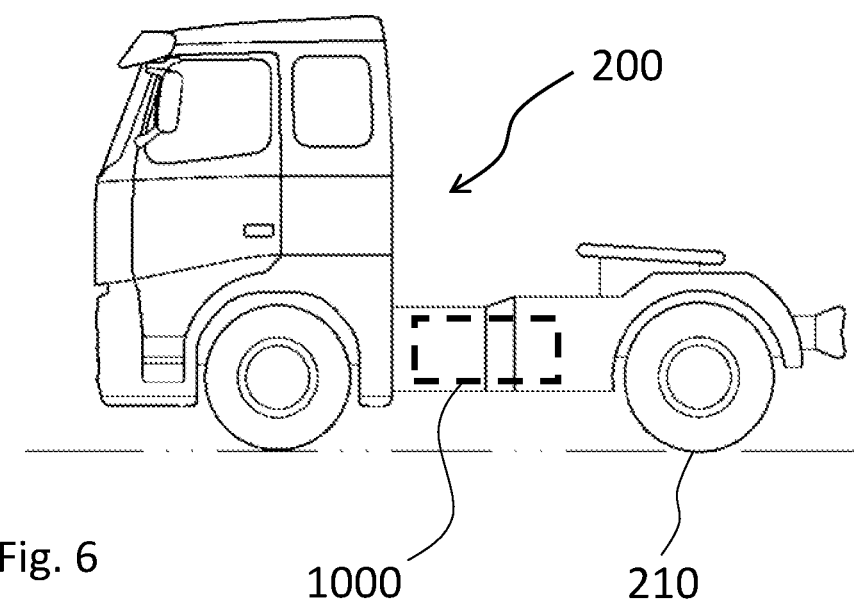
200
Fig. 6     1000     210

PROTECTIVE COVER FOR PROTECTING A VENTILATION DEVICE OF A BATTERY HOUSING

TECHNICAL FIELD

The invention relates to a protective cover for protecting a ventilation device of a battery housing. The invention also relates to a ventilation arrangement, a battery housing and a vehicle.

The invention can be applied in heavy-duty vehicles, such as trucks, buses and construction equipment. Although the invention will be described with respect to a truck, the invention is not restricted to this particular vehicle, but may also be used in other vehicles such as marine vessels, wheel loaders, excavators, buses and passenger cars.

BACKGROUND

A battery unit for a vehicle, such as a lithium-ion battery, may be enclosed in a battery housing. In particular, a battery housing for the battery unit is typically used for protecting the battery unit during use, e.g. during travelling of the vehicle.

It is known to provide such a battery housing with at least one ventilation device comprising an airflow opening which is arranged to provide an airflow between an inside of the battery housing and an external environment. The ventilation device may be arranged to regulate pressure level and moisture level inside the battery housing.

Even though it is known to use the above-mentioned battery housing for protecting the battery unit during use, there is still a strive to develop further improved technology relating to such battery housings, in particular for battery housings which are used in harsh environments.

SUMMARY

In view of the above, an object of the invention is to provide a protective cover for protecting a ventilation device of a battery housing which alleviates at least one drawback of the prior art, or which at least provides a suitable alternative. Other objects of the invention are to provide a ventilation arrangement, a battery housing and/or a vehicle, which alleviate at least one drawback of the prior art, or which at least provide suitable alternatives.

Hence, there is provided a protective cover for protecting a ventilation device of a battery housing. The ventilation device comprises an airflow opening which is arranged to provide an airflow between an inside of the battery housing and an external environment, and the battery housing and/or the ventilation device comprises a first flange portion which extends around the airflow opening, and which further extends in a radially outward direction with respect to the airflow opening. Thereby, the first flange portion forms a grip surface around the airflow opening for the protective cover.

The protective cover comprises:

an airflow duct extending between a first opening and a second opening, wherein the first opening of the airflow duct is arranged to be fluidly connected to the airflow opening of the ventilation device and wherein the second opening is arranged to be fluidly connected to the external environment, an attachment portion associated with the first opening for attaching the protective cover to the first flange portion so that the protective cover covers the airflow opening, wherein the attachment portion, when being attached to the first flange portion, extends around the airflow opening, wherein the protective cover comprises at least two separate parts which are releasably attachable to each other and arranged so that the attachment portion can be split into at least two separate attachment sections to allow the protective cover to be attached to and released from the first flange portion.

By the provision of the protective cover as disclosed herein, improved protection for the ventilation device is provided. More particularly, it has been realized that the ventilation function of the ventilation device may be impaired when the battery housing is used in a harsh environment. Thereby, by using the herein disclosed protective cover, the risk of impairing the ventilation function during use can be reduced. In addition, by the provision of the protective cover as disclosed herein, the mounting/dismounting procedures, i.e. attaching and releasing the protective cover to/from the ventilation device, can be improved. This is achieved by the specific configuration of the protective cover, i.e. that the protective cover comprises at least two separate parts.

Optionally, the at least two separate parts are further arranged to form the airflow duct when being attached to each other. This implies a further cost-effective configuration where the at least two separate parts are also arranged to form the airflow duct.

Optionally, the at least two separate parts are two halves of the protective cover which are releasably attachable to each other. This implies a facilitated mounting/dismounting procedure. For example, the mounting/dismounting procedure may thereby require fewer operations by a user.

Optionally, the attachment portion comprises a second and a third flange portion which extend around an inner perimeter surface of the attachment portion, and which further extend in a radially inward direction thereof, corresponding to the radial direction of the airflow opening when the protective cover is attached to the first flange portion. The second and the third flange portions are offset from each other, as seen in an axial direction of the protective cover, the axial direction being perpendicular to the radial direction of the protective cover, thereby forming a gap therebetween so that the first flange portion can be accommodated in-between the second and the third flange portions.

This configuration has shown to provide a reliable and robust connection to the ventilation device during use. Radially inward and radially outward as used herein refers to radial directions with respect to a centre, in this case to a centre of the attachment portion, which may correspond to a centre of the airflow opening when the protective cover is attached to the ventilation device. The inner perimeter surface of the attachment portion may be annular, or round.

Still optionally, the second flange portion comprises protrusions which extend in the radially inward direction, i.e. towards the centre of the attachment portion, wherein the protrusions are separated by intermediate recesses which extend radially outward so as to allow the protective cover to be attached to the first flange portion in more than one predefined angular position with respect to the first flange portion. The angular positions are angular positions with respect to a rotational axis of the protective cover. The rotational axis of the protective cover is preferably arranged to extend along a centre axis of the airflow opening when the protective cover is attached to the ventilation device. For example, the protrusions are formed as teeth, such as teeth with sharp edges, for example triangular shaped protrusions, and/or as smooth outwardly bulging protrusions, such as curved-shaped portions. The protrusions as disclosed herein provides increased flexibility for the protective cover. More specifically, by being able to provide the protective cover in more than one predefined angular position with respect to the first flange portion, i.e. by being able to rotate the protective cover, the second opening can be oriented in different directions. Thereby, it can be assured that the second opening is not directed in less favourable directions. For example, it can be assured that the second opening is not pointing in a direction so that mud, or any other debris, is entered into the second opening during use.

Optionally, the airflow duct comprises a first airflow duct extension associated with the first opening and a second airflow duct extension associated with the second opening, wherein the first airflow duct extension extends in an axial direction of the protective cover, corresponding to an axial direction of the airflow opening when the protective cover is attached to the first flange portion, and wherein the second airflow duct extension is angled with respect to the first airflow duct extension, such as angled so that the second airflow duct extension extends substantially in the radial direction. Thereby, a more compact protective cover can be provided where e.g. the second airflow duct extension extends in parallel to an outer surface of the battery housing during use. This configuration also implies that the second opening can be oriented in more favourable directions.

Optionally, the at least two separate parts further comprises fastening means for attaching the at least two separate parts to each other. Still optionally, the fastening means comprises any one of a screw, a bolt, a nut, a cable tie and a snap-fit connection member, such as a clip member.

Optionally, the protective cover comprises an outer peripheral surface, such as an annular outer peripheral surface, associated with the attachment portion, e.g. being provided radially outside the attachment portion, wherein the outer peripheral surface is adapted to receive a cable tie so that the attachment portion is clamped to the first flange portion. Still optionally, at least one radially protruding portion may be associated with the outer peripheral surface and arranged to align the cable tie on the outer peripheral surface during use. The outer peripheral surface implies a reliable and robust connection of the protective cover to the ventilation device.

Optionally, the protective cover further comprises a sealing member provided in an attachment interface in-between the at least two separate parts. Thereby, the risk of any leakage between the at least two separate parts can be reduced.

Optionally, the at least two separate parts are arranged so that respective portions thereof overlap each other when the at least two separate parts are attached to each other. This implies an improved connection interface and/or an improved sealing function between the at least two separate parts.

Hence, there is provided a ventilation arrangement for a battery housing, comprising a ventilation device, wherein the ventilation device is arranged to provide an airflow through an airflow opening between an inside of the battery housing and an external environment.

The battery housing and/or the ventilation device comprises a first flange portion which extends around the airflow opening, and which further extends in a radially outward direction with respect to the airflow opening, and wherein the ventilation arrangement further comprises a protective cover according to any one of the embodiments of the first aspect of the invention.

Advantages and effects of the second aspect of the invention are analogous to the advantages and effects of the first aspect of the invention. It shall also be noted that all embodiments of the second aspect of the invention are combinable with all embodiments of the first aspect of the invention, and vice versa.

Optionally, when the protective cover comprises protrusions as mentioned herein, the first flange portion comprises corresponding protrusions configured to be in meshing engagement with the protrusions of the second flange portion.

Hence, there is provided a battery housing comprising a ventilation arrangement according to any one of the embodiments of the second aspect of the invention.

Advantages and effects of the third aspect of the invention are analogous to the advantages and effects of the first and second aspects of the invention. It shall also be noted that all embodiments of the third aspect of the invention are combinable with all embodiments of the first and second aspects of the invention, and vice versa.

Hence, there is provided a vehicle comprising a battery housing according to any one of the embodiments of the third aspect of the invention.

Advantages and effects of the fourth aspect of the invention are analogous to the advantages and effects of the first, second and third aspects of the invention. It shall also be noted that all embodiments of the fourth aspect of the invention are combinable with all embodiments of the first, second and third aspects of the invention, and vice versa.

The battery housing may comprise a battery unit, such as a lithium-ion battery unit. The battery unit may be configured to power one or more electric motors of the vehicle which are used for propulsion of the vehicle. The battery unit may be a high-voltage battery unit, such as a battery unit with a voltage level of 300-1000 v, such as 400 v, 600 v or 800 v.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 5 is a perspective view of a battery housing according to an example embodiment of the present invention, FIG. 6 is a side view of a vehicle according to an example embodiment of the present invention, and FIG. 7 show schematic views of protective covers according to example embodiments of the present invention.

Figures 1, 2:
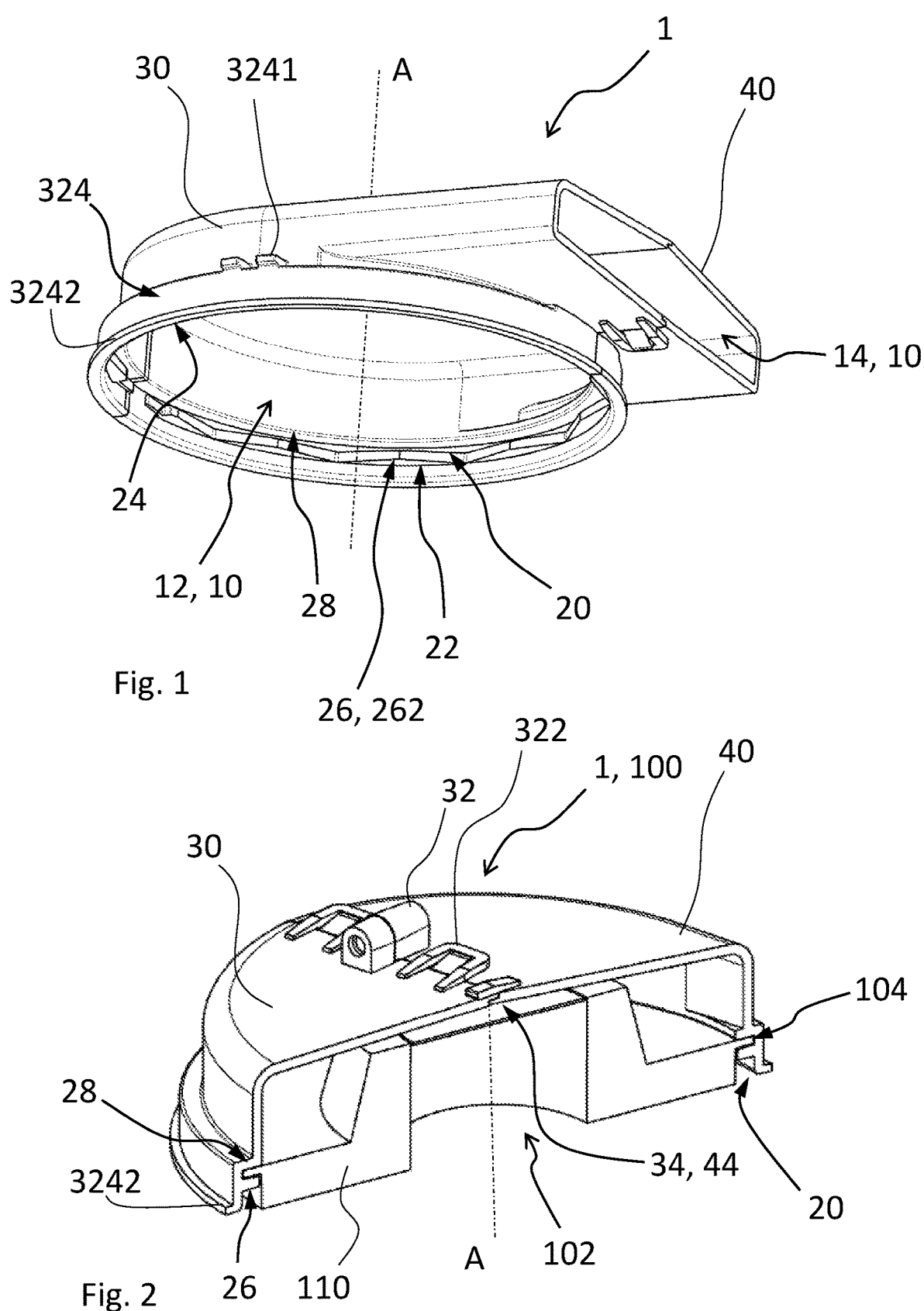
FIG. 1 is a perspective view of a protective cover according to an example embodiment of the present invention.
FIG. 2 is a perspective and sectional view of a protective cover and a ventilation arrangement according to an example embodiment of the present invention.

The drawings are schematic and not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters throughout the drawings refer to the same, or similar, type of element unless expressed otherwise.

DETAILED DESCRIPTION OF EXAMPLE EMBODIMENTS OF THE INVENTION

FIG. 1 depicts a perspective view of a protective cover 1 according to an example embodiment of the present invention. FIG. 2 depicts the protective cover 1 in FIG. 1 when it is provided on a ventilation device 110. Accordingly, FIG. 2 also shows a ventilation arrangement 100 according to an example embodiment of the invention. FIG. 2 shows a cross-sectional view, the cross-section being defined by a plane including an axis A. The axis A corresponds to a rotational axis of the protective cover 1 and to an axial direction of the protective cover 1.

The protective cover 1 is intended to protect the ventilation device 110 during use. The ventilation device 110 is intended to be provided on a battery housing 1000, for example the battery housing 1000 as shown in FIG. 5.

The ventilation device 110 comprises an airflow opening 102 which is arranged to provide an airflow between an inside of the battery housing 1000 and an external environment. As shown in FIG. 2, the airflow opening 102 may also extend along the axis A, i.e. the axis A may also represent a main flow direction of the airflow opening 102. In addition, the battery housing 1000 and/or the ventilation device 110 comprises a first flange portion 104 which extends around the airflow opening 102, and which further extends in a radially outward direction with respect to the airflow opening 102. Accordingly, the first flange portion 104 extends radially outwardly with respect to the axis A. In the embodiment shown in FIG. 2, the ventilation device 110 comprises the first flange portion 104.

The protective cover 1 comprises an airflow duct 10 extending between a first opening 12 and a second opening 14. The first opening 12 of the airflow duct 10 is arranged to be fluidly connected to the airflow opening 102 of the ventilation device 110 and the second opening 14 is arranged to be fluidly connected to the external environment. By fluidly connected means herein that a connection for fluid, typically air, is provided. In other words, fluid, typically air, can thereby pass between the first opening 12 and the airflow opening 102, and between the second opening 14 and the external environment.

The protective cover 1 further comprises an attachment portion 20 which is associated with the first opening 12 for attaching the protective cover 1 to the first flange portion 104 so that the protective cover 1 covers the airflow opening 102. In the embodiment shown in FIGS. 1 and 2, the attachment portion 20 defines the first opening 10. When the attachment portion 20 is attached to the first flange portion 104, it extends around the airflow opening 102.

The first flange portion 104 is in this example extending continuously around the airflow opening 102, i.e. it may for example be disc-shaped. However, it shall be noted that the first flange portion may in other embodiments extend around the airflow opening in a non-continuous manner. For example, it may be formed by a plurality of radially extending protrusions (not shown) with intermediate recesses in-between the protrusions, such as forming a number of teeth-formed elements provided around the airflow opening 102.

The protective cover 1 further comprises at least two separate parts 30, 40 which are releasably attachable to each other and arranged so that the attachment portion 20 can be split into at least two separate attachment sections 22, 24 to allow the protective cover 1 to be attached to and released from the first flange portion 102.

As shown in the embodiment of FIGS. 1 and 2, the protective cover 1 may be split along a plane which includes the axis A.

As further shown, the at least two separate parts 30, 40 may further be arranged to form the airflow duct 10 when being attached to each other. Accordingly, the at least two separate parts 30, 40 may be two halves of the protective cover 1 which are releasably attachable to each other.

As further depicted in e.g. FIGS. 1 and 2, the attachment portion 20 may comprise a second and a third flange portion 26, 28 which extend around an inner perimeter surface of the attachment portion 20, and which further extend in a radially inward direction thereof, corresponding to the radial direction of the airflow opening 102 when the protective cover 1 is attached to the first flange 102. In addition, the second and the third flange portions 26, 28 are offset from each other, as seen in the axial direction A of the protective cover 1, the axial direction A being perpendicular to the radial direction of the protective cover 1, thereby forming a gap therebetween so that the first flange portion 102 can be accommodated in-between the second and the third flange portions 26, 28.

As further depicted, the second flange portion 26 may comprise protrusions 262 which extend in the radially inward direction, i.e. towards the axis A, wherein the protrusions 262 are separated by intermediate recesses which extend radially outward so as to allow the protective cover 1 to be attached to the first flange portion 102 in more than one predefined angular position with respect to the first flange portion 102. As shown, the protrusions 262 may be formed as teeth, such as teeth with sharp edges, for example triangular shaped protrusions. Additionally, or alternatively, the protrusions may be formed as smooth outwardly bulging protrusions, such as curved-shaped portions.

For example, as shown, the inner perimeter surface of the attachment portion 20 and/or of the first airflow opening 12 is/are annular, i.e. circular. This for example enables the protective cover 1 to be rotated with respect to the axis A before it is firmly attached to the ventilation device 110.

Figures 3, 4:
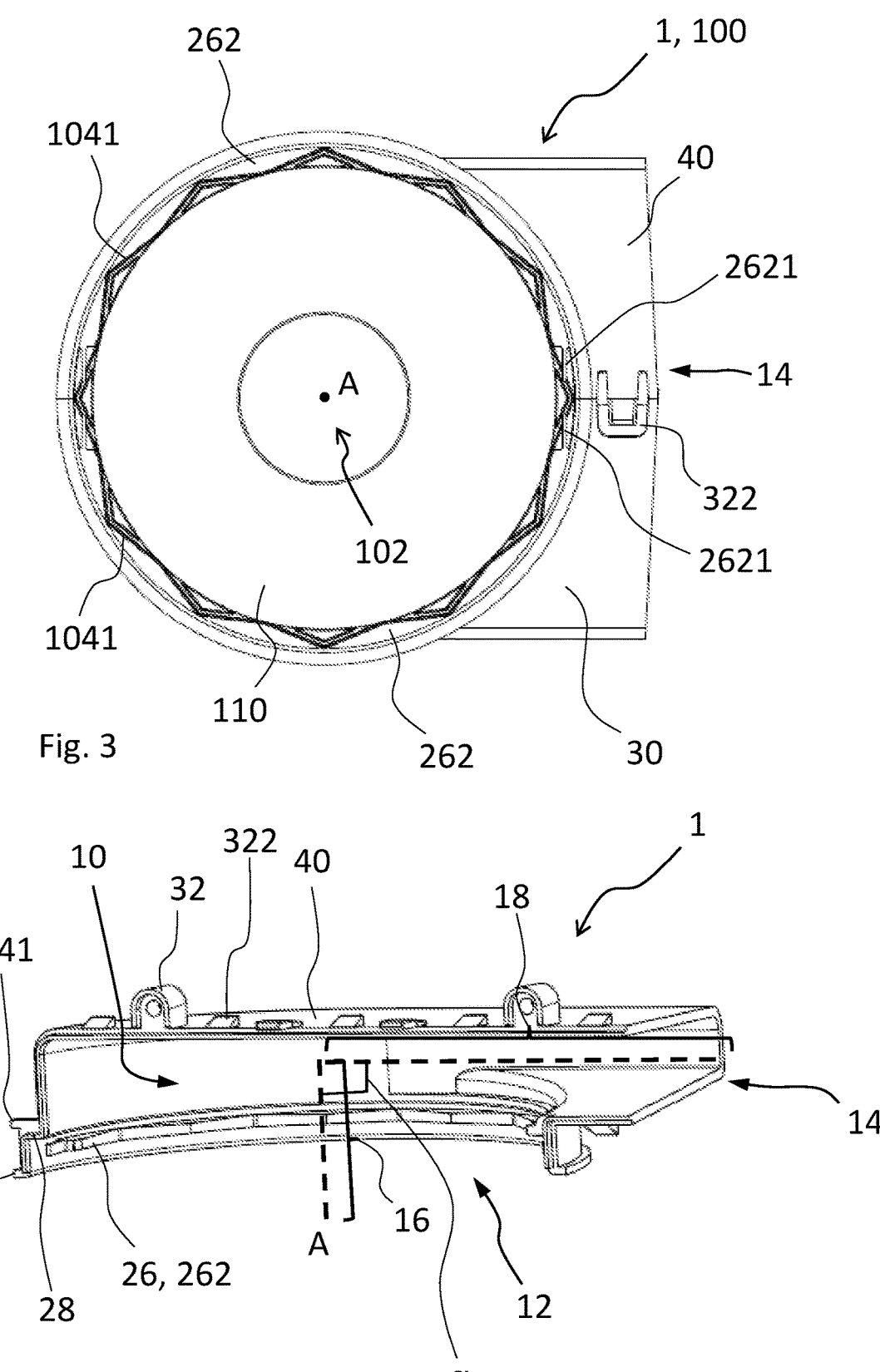
FIG. 3 is a view from below of a protective cover and a ventilation arrangement according to an example embodiment of the present invention.
FIG. 4 is a perspective and sectional view of a protective cover according to an example embodiment of the present invention.

FIG. 4 depicts one half 40 of the two separate parts as shown in e.g. FIG. 1. As shown, the airflow duct 10 may comprise a first airflow duct extension 16 associated with the first opening 12 and a second airflow duct extension 18 associated with the second opening 14. The first airflow duct extension 16 extends in the axial direction A of the protective cover 1, corresponding to the axial direction of the airflow opening 102 when the protective cover 1 is attached to the first flange portion 104. The second airflow duct extension 18 is angled with respect to the first airflow duct extension 16, in this example angled so that the second airflow duct extension 18 extends substantially in the radial direction. In other words, the protective cover 1 is in this example formed so that the airflow duct 10 is bent by an angle α, which in this example is 90 degrees. Other angles α are also feasible, such as a bending angle α between the two extensions in the range of 30-120 degrees.

As further depicted in e.g. FIG. 2 and FIG. 4, the at least two separate parts 30, 40 may further comprise fastening means 32, 322 for attaching the at least two separate parts 30, 40 to each other. For example, as shown, the fastening means 32 may be a screw or bolt connection, i.e. the connection 32 may comprise two corresponding apertures on each separate part 30, 40 for receiving a screw or bolt therethrough. Additionally, or alternatively, the fastening means 322 may be a snap-fit connection member. In the shown example, the snap fit connection member is in the form of a clip member which snaps into a corresponding clip receiving member.

Additionally, or alternatively, the at least two separate parts 30, 40 may be attached to each other by providing a cable tie (not shown) around the at least two separate parts 30, 40. For example, as shown in e.g. FIG. 1, the protective cover may comprise an outer peripheral surface 324, in this example an annular outer peripheral surface, which is associated with the attachment portion 20. In the shown embodiment, the outer peripheral surface 324 is provided radially outside the attachment portion 20. The outer peripheral surface 324 is adapted to receive a cable tie so that the attachment portion 20 is clamped to the first flange portion 104. Still optionally, as further shown in e.g. FIG. 1, at least one first radially protruding portion 3241 may be associated with the outer peripheral surface 324 and arranged to align the cable tie on the outer peripheral surface 324 during use. In the shown example, the first radially protruding portion 3241 is provided adjacent the outer peripheral surface 324, in this example axially above the outer peripheral surface 324. By the at least one first radially protruding portion 3241, unintentional release of the cable tie can be avoided, i.e. the cable tie is prevented from moving upwardly in the axial direction, i.e. in a direction corresponding the axis A. Additionally, or alternatively, as further shown, at least one second radially protruding portion 3242 may be associated with the outer peripheral surface 324 and arranged to align the cable tie on the outer peripheral surface 324 during use. In the shown example, the second radially protruding portion 3242 is provided adjacent the outer peripheral surface 324, in this example axially below the outer peripheral surface 324.

The protective cover 1 may further comprise a sealing member (not shown) which is provided in an attachment interface in-between the at least two separate parts 30, 40. For example, the sealing member may be a rubber-strip.

As further depicted in e.g. FIG. 2, the at least two separate parts 30, 40 may be arranged so that respective portions 34, 44 thereof overlap each other when the at least two separate parts 30, 40 are attached to each other. In the shown example, the respective portions 34, 44 form a connection interface between the at least two separate parts 30, 40. One portion 44 of one of the at least two separate parts 40 forms a seat surface for the other portion 34 of the other separate part 30, wherein the other portion 34 is received on the seat surface 44.

FIG. 3 depicts the ventilation arrangement 100 from below.

The ventilation arrangement 100 comprises the ventilation device 110. The ventilation device 110 is arranged to provide an airflow through the airflow opening 102 between an inside of the battery housing 1000 and an external environment. The ventilation arrangement 100 further comprises the protective cover 1.

As shown, the first flange portion 104 may comprises corresponding protrusions 1041 which are configured to be in meshing engagement with the protrusions 262 of the second flange portion 26. The corresponding protrusions 1041 are here facing downwardly and away from the first flange portion 104. The first flange portion 104 is partly concealed in FIG. 3 by the protrusions 262 of the protective cover 1.

As further shown, the attachment portion 20 may comprise one or more spring-biasing members 2621 which are configured to exert a force in a radial direction on the ventilation device 110. In the shown example, the spring-biasing members 2621 are in the form of elongated pins extending substantially in a tangential direction of the inner perimeter surface of the attachment portion 20. The spring-biasing members 2621 are elastic so that they can flex outwardly and/or inwardly towards and/or away from the axis A. Additionally, or alternatively, the ventilation device 110 may comprise spring-biasing members (not shown) which are configured to exert a force in a radial direction on the protective cover 1. By the spring-biasing members 2621, an improved and more reliable attachment between the protective cover 1 and the ventilation device 110 can be achieved. For example, by said spring-biasing members 2621, the risk of unwanted vibrations can be reduced.

FIG. 5 depicts an example of a battery housing 1000 in perspective view. The battery housing 1000 comprises a ventilation arrangement 100 as e.g. shown in FIG. 2. Accordingly, as shown in this example, two protective covers 1 are provided on respective ventilation devices 110 (not shown in FIG. 5) of the battery housing 1000. The direction of the axis A of each respective protective cover 1 is in this embodiment corresponding to an extension of a normal of a surface 1100 on which the respective ventilation device 110 is provided.

FIG. 6 depicts a side view of a vehicle 200 comprising a battery housing 1000 according to the invention. The vehicle 200 is in this example a truck, more specifically a towing truck. The truck 200 is configured to be driven by one or more electric motors (not shown) which are powered by a battery unit (not shown). The battery unit is provided inside the battery housing 1000. The one or more electric motors are configured to drive wheels 210, or any other type of ground engaging means, of the vehicle 200. It shall be noted that the vehicle may be any other type of vehicle as for example disclosed herein.

Figure 7:
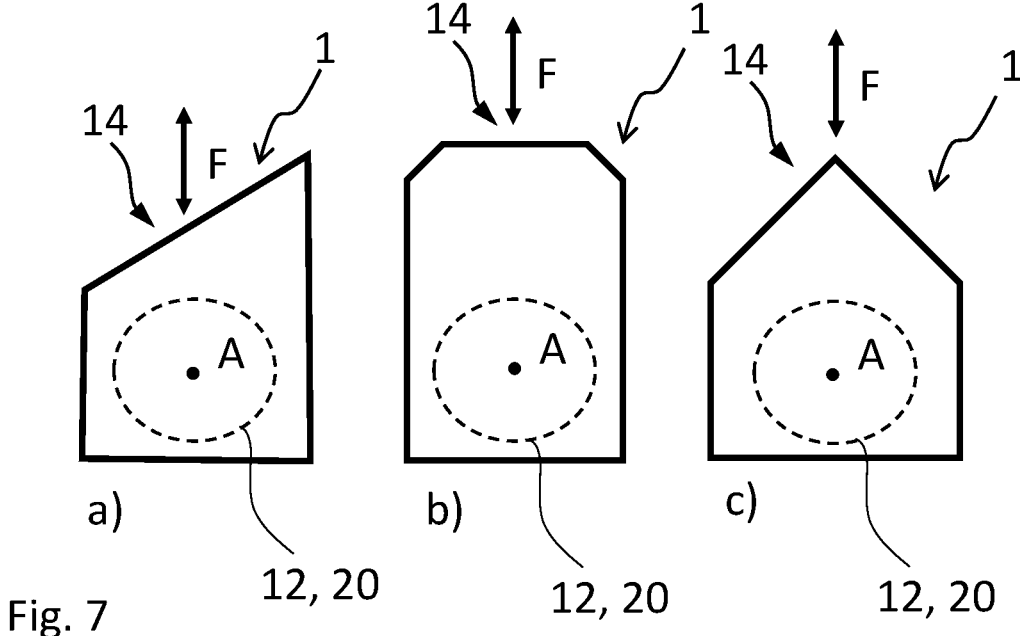

FIGS. 7*a-c* show schematic views from above of respective protective covers 1 according to example embodiments of the invention. The embodiments depict that the second opening 14 can have different shapes. The different shapes may for example as shown be noticed when viewing the protective cover 1 from above, i.e. in a view directed along the axis A. As shown in FIG. 7*a*, an outer peripheral portion of the protective cover 1 defining the second opening 14 may be angled with respect to a main flow direction F of an airflow passing the second opening 14. FIG. 7*b* shows another example where an outer peripheral portion of the protective cover 1 defining the second opening 14 comprises respective chamfered sections at respective corner portions of the second opening 14.

FIG. 7*c* shows yet another example where an outer peripheral portion of the protective cover 1 defining the second opening 14 is formed by two angled sections which together form a tip pointing away from the protective cover 1 in a radial direction with respect to the axis A. It has been found that it may be advantageous if the outer peripheral portion of the protective cover 1 defining the second opening 14 has an irregular shape. Thereby, the risk of ice getting stuck at the second opening during use may be reduced. More particularly, by the irregular shape, i.e. in contrast to a straight cut which is perpendicular to the main flow direction F of the airflow passing the second opening 14, a rattling or vibrating effect may be accomplished at the outer peripheral portion defining the second opening 14. This effect may reduce the risk of ice getting stuck at the second opening 14 during use in cold conditions.

It is to be understood that the present invention is not limited to the embodiments described above and illustrated in the drawings; rather, the skilled person will recognize that many changes and modifications may be made within the scope of the appended claims.

The invention claimed is:

1. A protective cover for protecting a ventilation device of a battery housing, wherein the ventilation device comprises an airflow opening which is arranged to provide an airflow between an inside of the battery housing and an external environment, and wherein the battery housing and/or the ventilation device comprises a first flange portion which extends around the airflow opening, and which further extends in a radially outward direction with respect to the airflow opening, the protective cover comprising:
an airflow duct extending between a first opening and a second opening, wherein the first opening of the airflow duct is arranged to be fluidly connected to the airflow opening of the ventilation device and wherein the second opening is arranged to be fluidly connected to the external environment,
an attachment portion associated with the first opening for attaching the protective cover to the first flange portion so that the protective cover covers the airflow opening, wherein the attachment portion, when being attached to the first flange portion, extends around the airflow opening,
wherein the protective cover comprises at least two separate parts which are releasably attachable to each other and arranged so that the attachment portion can be split into at least two separate attachment sections to allow the protective cover to be attached to and released from the first flange portion.

2. The protective cover according to claim 1, wherein the at least two separate parts are further arranged to form the airflow duct when being attached to each other.

3. The protective cover according to claim 1, wherein the at least two separate parts are two halves of the protective cover which are releasably attachable to each other.

4. The protective cover according to claim 1, wherein the attachment portion comprises a second and a third flange portion which extend around an inner perimeter surface of the attachment portion, and which further extend in a radially inward direction thereof, corresponding to the radial direction of the airflow opening when the protective cover is attached to the first flange portion, and wherein the second and the third flange portions are offset from each other, as seen in an axial direction of the protective cover, the axial direction being perpendicular to the radial direction of the protective cover, thereby forming a gap therebetween so that the first flange portion can be accommodated in-between the second and the third flange portions.

5. The protective cover according to claim 4, wherein the second flange portion comprises protrusions which extend in the radially inward direction, wherein the protrusions are separated by intermediate recesses which extend radially outward so as to allow the protective cover to be attached to the first flange portion in more than one predefined angular position with respect to the first flange portion.

6. The protective cover according to claim 5, wherein the protrusions are formed as teeth, such as teeth with sharp edges, for example triangular shaped protrusions, and/or as smooth outwardly bulging protrusions, such as curved-shaped portions.

7. The protective cover according to claim 1, wherein the airflow duct comprises a first airflow duct extension associated with the first opening and a second airflow duct extension associated with the second opening, wherein the first airflow duct extension extends in an axial direction of the protective cover, corresponding to an axial direction of the airflow opening when the protective cover is attached to the first flange portion, and wherein the second airflow duct extension is angled with respect to the first airflow duct extension, such as angled so that the second airflow duct extension extends substantially in the radial direction.

8. The protective cover according to claim 1, wherein the at least two separate parts further comprises fastening means for attaching the at least two separate parts to each other.

9. The protective cover according to claim 8, wherein the fastening means comprises any one of a screw, a bolt, a nut, a cable tie and a snap-fit connection member.

10. The protective cover according to claim 1, further comprising a sealing member provided in an attachment interface in-between the at least two separate parts.

11. The protective cover according to claim 1, wherein the at least two separate parts are arranged so that respective portions thereof overlap each other when the at least two separate parts are attached to each other.

12. A ventilation arrangement for a battery housing, comprising a ventilation device, wherein the ventilation device is arranged to provide an airflow through an airflow opening between an inside of the battery housing and an external environment, and wherein the battery housing and/or the ventilation device comprises a first flange portion which extends around the airflow opening, and which further extends in a radially outward direction with respect to the airflow opening, and wherein the ventilation arrangement further comprises a protective cover according to claim 1.

13. The ventilation arrangement according to claim 12, wherein the first flange portion comprises corresponding protrusions configured to be in meshing engagement with protrusions of the second flange portion.

14. A battery housing comprising a ventilation arrangement according to claim 12.

15. A vehicle comprising a battery housing according to claim 14.

* * * * *